Figure 1:
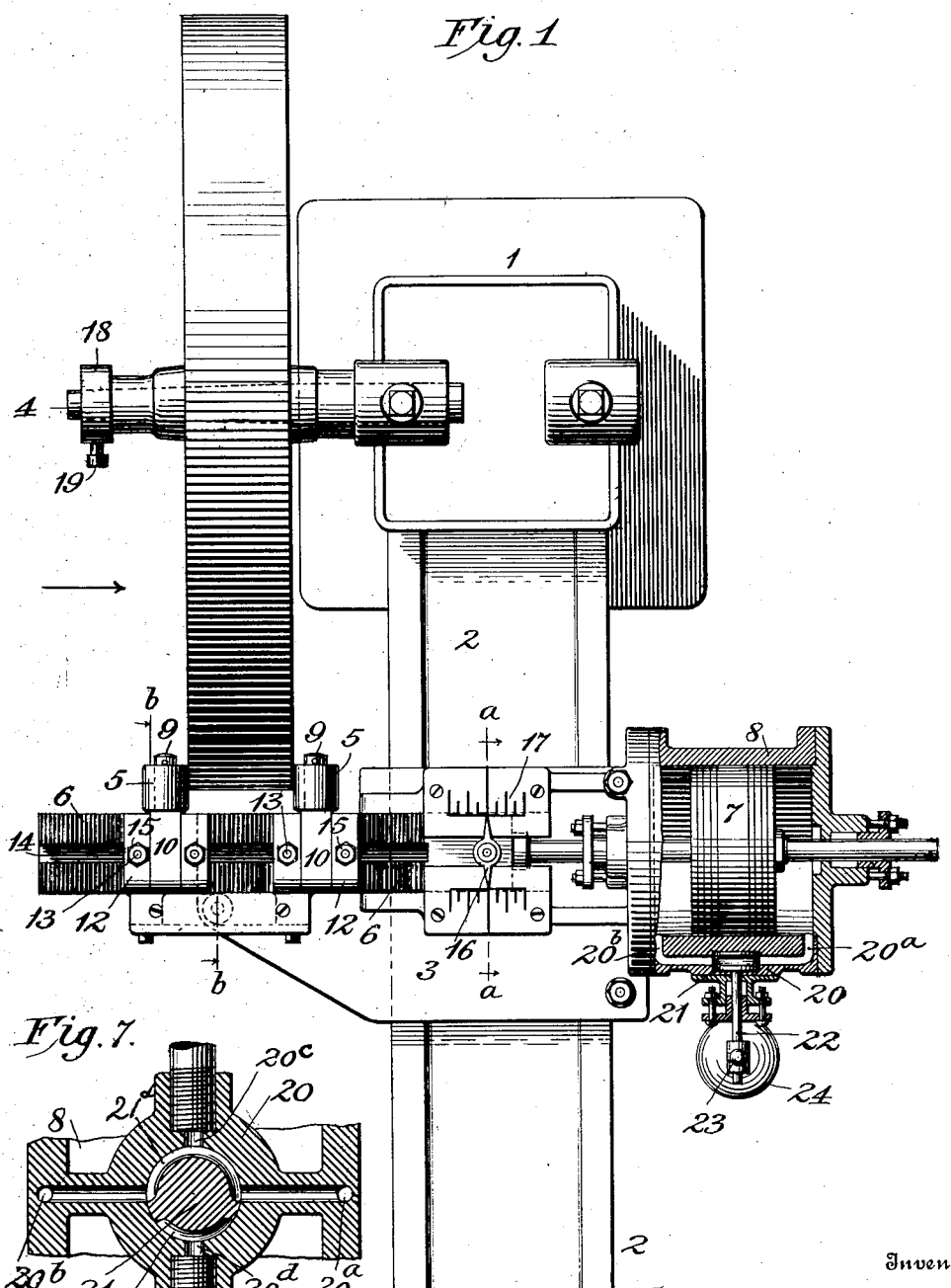

No. 852,829. PATENTED MAY 7, 1907.
E. EINFELDT.
MECHANISM FOR TRUING METAL WHEELS.
APPLICATION FILED FEB. 13, 1906.

3 SHEETS—SHEET 1.

Witnesses
Sidney P. Hollingsworth
Luther Morrison

Inventor
Emil Einfeldt
By Philip T. Dodge
Attorney

No. 852,829. PATENTED MAY 7, 1907.
E. EINFELDT.
MECHANISM FOR TRUING METAL WHEELS.
APPLICATION FILED FEB. 13, 1906.
3 SHEETS—SHEET 2.
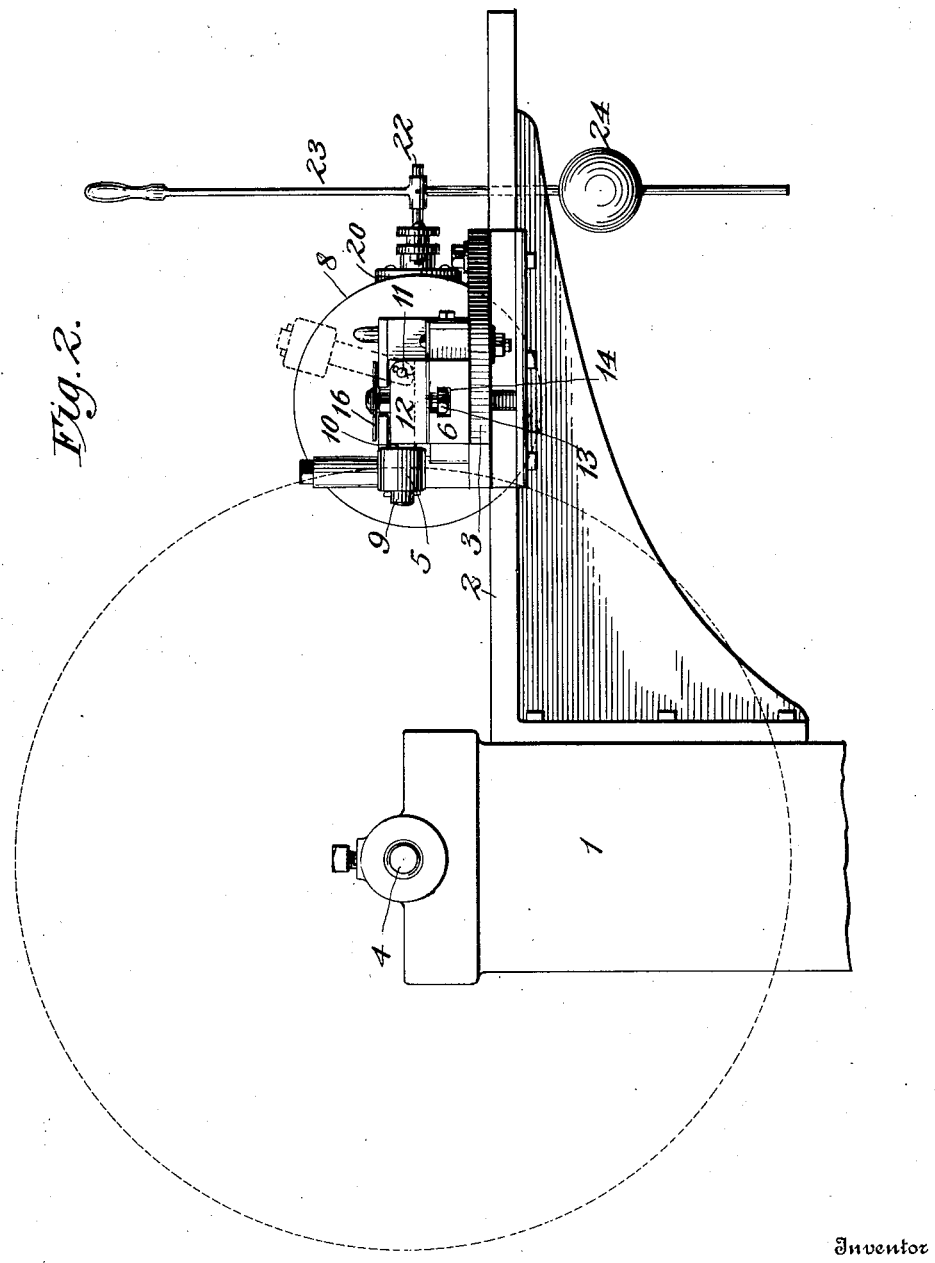

No. 852,829. PATENTED MAY 7, 1907.
E. EINFELDT.
MECHANISM FOR TRUING METAL WHEELS.
APPLICATION FILED FEB. 13, 1906.
3 SHEETS—SHEET 3.
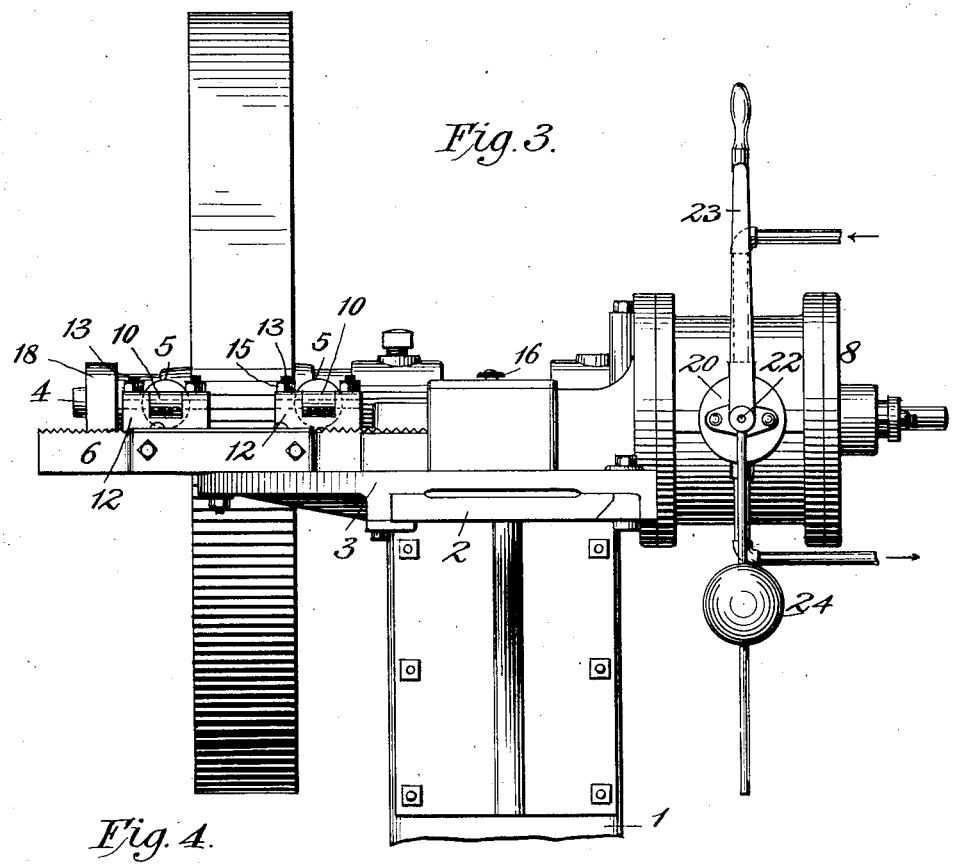
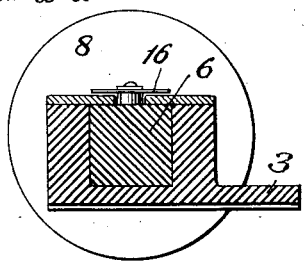
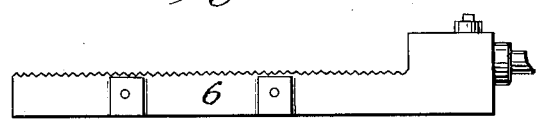
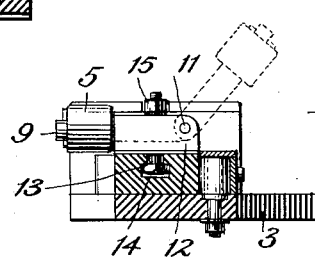
Witnesses
Sidney P. Hollingsworth
Luther Morrison
Inventor
Emil Einfeldt
By Philip T. Dodge
Attorney

UNITED STATES PATENT OFFICE.

EMIL EINFELDT, OF DAVENPORT, IOWA, ASSIGNOR TO BETTENDORF METAL WHEEL COMPANY, A CORPORATION OF IOWA.

MECHANISM FOR TRUING METAL WHEELS.

No. 852,829. Specification of Letters Patent. Patented May 7, 1907.

Application filed February 13, 1906. Serial No. 300,938.

*To all whom it may concern:*

Be it known that I, EMIL EINFELDT, of Davenport, county of Scott, and State of Iowa, have invented a new and useful Improvement in Mechanism for Truing Metal Wheels, of which the following is a specification.

In the manufacture of metal wheels, it is the practice under certain methods, to fasten the spokes to the hub and to the rim before the ends of the rim are welded together or closed, the final step in finishing the wheel being the welding of the rim. Under other methods of manufacture, the spokes are fastened to the hub and to a previously closed or finished rim, that is a rim which previous to the connection of the spokes therewith, has had its ends welded together. In either case, but more frequently in that first mentioned, the rim does not bear its true and proper relation to the hub, it extending at one or the other side beyond the position which it should occupy in the completed and trued wheel.

In the case of a wheel, with the spokes fastened to an open rim, the centers of the meeting ends of the rim will fail to aline, and before the rim is welded it is necessary to apply pressure or a bending strain to one or the other edge of the rim, to bring the centers of the meeting ends into true alinement, and to correct any deviation of the rim from its true position. This has, as far as I am aware, been accomplished manually by cumbersome, laborious and slow methods, which it is the aim of the present invention to overcome.

To this end the invention comprehends a mechanism actuated by power and controlled in its action by the attendant, and adapted by its operation on the rim, to apply pressure thereto and speedily and accurately correct any deviation from its true and proper position relative to the spokes and hub.

By the use of my improved device, not only is it possible to bring the rim to true position, but by its use, any deviation or untrueness of a rim of a completed wheel, even in the slightest degree, may be instantly detected and the extent of deviation indicated, so that by the operation of the mechanism the defect may be remedied.

My mechanism is not only intended to treat wheels with the spokes connected with the hub and to an open rim, but is also adapted for employment in truing up wheels with the spokes connected to the hub and a closed rim.

Figure 7:
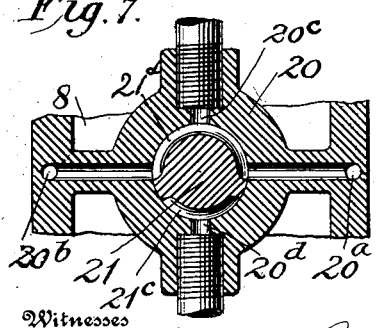

In the accompanying drawings: Figure 1 is a top plan view of my improved mechanism, the wheel to be trued being shown in position, in operative relation to the mechanism. Fig. 2 is an elevation of the same looking in the direction of the full-line arrow in Fig. 1. Fig. 3 is a similar view looking in the direction of the dotted arrow in Fig. 1. Fig. 4 is a vertical sectional elevation on the line $a$—$a$ of Fig. 1. Fig. 5 is a vertical sectional elevation on the line $b$—$b$ of Fig. 1. Fig. 6 is a side elevation of a detail. Fig. 7 is a sectional view of the controlling valve for the actuating cylinder.

Referring to the drawings: 1 represents a frame or standard adapted to rest on or be secured to the floor, and having projecting forwardly from it a horizontal support or bracket 2, sustaining a platform 3 and adjustable on the bracket to and from the standard, for the purpose presently to be described. The standard has projecting from its side a wheel supporting spindle 4, to receive the hub of the wheel to be trued, and permit it to be turned around on its axis to present the rim to the action of the operating devices.

The operating devices are mounted on the platform 3, and comprise two pressure abutments 5, between which the wheel rim is adapted to extend, the abutments being carried by a horizontal slide 6, mounted on the platform, and movable in the direction of the longitudinal axis of the hub, which slide is connected with and actuated by a piston 7 in a cylinder 8 sustained by the platform, the movements of the piston back and forth, acting to move the two abutments alternately in opposite directions, thereby urging them forcibly against the edges of the rim alternately.

The abutments are in the form of rollers mounted loosely on studs 9, on the ends of arms 10 pivoted as at 11, to blocks 12, which blocks have their under sides roughened and seated on the upper roughened side of the slide 6, to which slide the blocks are adjustably secured by vertical fastening bolts 13 having their head seated in an undercut groove 14 extending longitudinally of the slide, and project upwardly through the blocks, confining nuts 15 being applied to the ends of the bolts and serving to hold the blocks firmly in place on the slide, at the same time permitting of the adjustment of said blocks independently and in the longitudinal direction of the slide.

The slide is mounted and guided in ways on the platform, and near its inner end it is provided on its upper side with a pointer 16, adapted to be read in connection with the scale 17 to indicate the deviation of the rim from its true and proper position.

In the operation of the mechanism thus far described, the platform 3 is adjusted on its supporting bracket in such position that the two pressure abutments, when in their operative positions, will bear on opposite sides of the rim of the wheel to be trued, and the blocks carrying the abutments are so adjusted on the slide, that the abutments will be separated the proper distance apart to receive the rim snugly between them, these positions of the platform and abutments being of course determined by the diameter of the wheel and width of its rim.

To permit the wheel to be placed in position on its supporting spindle, the pressure abutments are first thrown back to the position indicated by dotted lines in Fig. 5, the hub of the wheel is then seated on the spindle and is confined thereon by means of a cap 18 or other suitable fastening device, applied to the end of the spindle and held removably in place by a pin 19, or otherwise. Finally the two abutments are turned down to their operative positions at the edges of the rim, as shown in Fig. 1. The wheel is now turned on its supporting spindle by hand, and the rim traveling between rollers constituting the abutments, will, if the rim is perfectly true and bears the proper relation to the spokes and hub, have no displacing effect on the slide, which will remain at rest with the pointer opposite the medial line of the scale. If, however, the rim deviates from its true position, it will force the slide laterally, through the medium of the pressure abutments, and the pointer will be moved beyond the medial line, thus indicating by its relation to said line the direction and extent of the deviation. The movement of the slide under these conditions is permitted by the piston being balanced in the cylinder by equal pressures on opposite sides, and the attendant in order to correct the deviation by subjecting the edges of the wheel to pressure by the abutments, admits pressure to one or the other sides of the piston, as the case may be, and the latter moving under the influence of the pressure, the abutments will be urged forcibly against the edge of the rim and subject it to a bending strain. For instance if on the rotation of the rim between the pressure rollers, the pointer is moved to the right, the attendant admits pressure to the right hand side of the cylinder, and the pressure rollers are, by the action of the piston, moved to the left, thus subjecting the rim to a bending pressure in a direction opposite the movement of the pointer, and this bending action is continued or repeated until the pointer remains at its central position. If, when the wheel is turned on its support, the pointer is moved to the left, the attendant admits pressure to the left hand end of the cylinder, with the result that the pressure abutment at the left will apply a bending pressure to the rim to bring the same to true position, which will be indicated by the pointer occupying a medial position. It is seen therefore, that the attendant is enabled to discern at once, any deviation of the rim, and by the control of pressure to the cylinder, is enabled to subject the rim to pressure on one edge or the other, according to the location or extent of the unevenness.

The control of pressure to the cylinder may be effected by any appropriate means, but I prefer to adopt the form of controlling valve of Fig. 7, where it is seen that the cylinder is provided with a valve casing 20 communicating by ports $20^a$, and $20^b$, with the opposite ends respectively of the cylinder, by port $20^c$ with the atmosphere to exhaust, and by port $20^d$ with the source of pressure. Within the casing is mounted an oscillating valve 21 having on one side a port $21^c$ by which the source of pressure may be connected with the opposite sides of the cylinder respectively, and having on its other side a port $21^d$ by means of which the opposite side of the cylinder may be connected respectively with the exhaust. The valve has connected with it a stem 22 extending to the outside, and provided with an operating lever 23, having a counter-balancing weight 24 applied to it below the stem which weight tends to hold the lever in a vertical position, with the side ports of the valve establishing communication, through the passage $21^d$, between the ends of the cylinder, and exhaust port $20^c$ so that the piston is evenly balanced. When now, it is desired to move the piston in one direction, to subject the rim to pressure on one side, the lever is swung to the right or left as the case may be, resulting in the rocking of the valve, and the admission of pressure to one end of the cylinder through the passage $21^c$ and appropriate side port and the opening of the other end of the cylinder to the exhaust, thus permitting the pressure to force the piston along. When the rim is to be subjected to pressure on the opposite edge, the lever is swung in order to reverse the actions described.

By mounting the platform so that it is adjustable on its bracket or support to and from the wheel spindle, wheels of different diameters may be acted on; and by mounting the pressure abutments on their slide so that they may be adjusted in the direction of movement of the slide, to and from each other and independently, rims of different widths may be acted on. The machine is therefore, by these various adjustments adapted to meet the changing conditions encountered in practice as to the diameter of the wheels, the width of the rims and the relations of these parts.

While I have shown and described a pointer carried by the slide and indicating the movements of the same, this is not essential to the operation of my machine. In practice it is found that the attendant, by watching the edge of the rim as the wheel is moved around on its support, is able to detect any deviation or unevenness of the same without the aid of the pointer, although for exceedingly slight inaccuracies, the use of the pointer would be advantageous.

It is manifest that other means than a piston and cylinder, may be employed for actuating the pressure abutments, the only requirement being that they shall be operated by power, under the control of the attendant.

Having thus described my invention, what I claim is:

1. In a machine of the type described, means for supporting a wheel, a pressure abutment, said wheel and abutment being one movable relative to the other in a direction transversely of the wheel rim, power actuated means operatively connected with and for forcibly moving said movable part, and means for controlling at will the operation of said power actuated means.

2. In a machine of the type described, the combination of means for supporting the wheel, a pressure abutment adapted to bear against the edge of the rim and movable in the direction of the hub axis, power-actuated means for moving said abutment, and means for controlling the action of said power-actuated means.

3. In a machine of the type described, the combination of means for supporting the wheel to be trued, a power actuated abutment adapted to subject the edge of the rim to pressure in the direction of the longitudinal axis of the hub, and means for controlling the action of said abutment.

4. In a machine of the type described, the combination of means for rotatably supporting the wheel to be trued, pressure abutments between which the rim is adapted to extend, said abutments being movable in the direction of the longitudinal axis of the hub, power-actuated means for positively moving said abutments to apply pressure, and means for controlling said power-actuated means.

5. In a machine of the type described, the combination of means for rotatably supporting the wheel to be trued, two pressure abutments adapted to bear on the edges of the rim and movable freely in unison in the direction of the axis of the hub, power-actuated mechanism for positively moving said abutments to apply pressure to the edges of the rim, and means for controlling said power-actuated mechanism.

6. In a machine of the type described, the combination of means for rotatably supporting the wheel to be trued, pressure abutments adapted to bear on opposite edges of the rim, a balanced piston operatively connected with said pressure abutments, and means for actuating said piston to move the abutments forcibly against the edges of the rim.

7. In a machine of the type described, the combination of means for rotatably supporting the wheel, two pressure abutments adapted to bear on opposite edges of the rim, a slide carrying said abutments and movable in the direction of the axis of the hub, operating mechanism connected with the slide, and means for controlling the said operating mechanism.

8. In a machine of the type described, the combination of means for rotatably supporting the wheel to be trued, pressure abutments adapted to bear against the edges of the rim, a member connecting said abutments and maintaining them in fixed relations and movable freely in the direction of the hubs axis, and a pointer carried by said connecting member.

9. In a machine of the type described, the combination of a support for the wheel, pressure abutments movable in the direction of the hub axis to apply pressure to the wheel rim, power-actuated means for moving said abutments to apply pressure, means for adjusting said abutments to and from the wheel support subject to their actuating mechanism, and means for controlling the action of said actuating mechanism.

10. In a machine of the type described, the combination of means for supporting the wheel, pressure abutments movable in the direction of the hub axis and adapted to apply pressure to the wheel rim, power-actuated mechanism for controlling the movements of said pressure abutments, means for adjusting said abutments to and from each other subject to the power-actuated mechanism, and means for controlling the action of the power-actuated mechanism.

11. In a machine of the type described, the combination of means for supporting the wheel, pressure abutments adapted to bear against the edges of the rim, power-actuated mechanism for positively moving said abutments in the direction of the hub axis to apply pressure to the rim, means for adjusting said abutments relatively to the wheel support in the direction of the axis of the hub subject to their actuating mechanism, and means for controlling the action of said actuating mechanism.

12. In a machine of the type described, the combination of means for supporting the wheel, pressure abutments adapted to bear against the edges of the rim, power-actuated mechanism for positively moving the said abutments in the direction of the hub axis to apply pressure to the rim, means for adjusting said abutments relatively to the wheel support in the direction of the axis of the hub subject to the action of the power-actuated mechanism, means for adjusting said abutments independently to and from each other subject to the action of the power-actuated mechanism, and means for controlling the action of said power-actuated mechanism.

13. In a machine of the type described, the combination of a wheel support, a slide movable in the direction of the hub axis, pressure abutments mounted on said slide and adjustable thereon in the direction of its movement, said abutments being adapted to bear against the edges of the rim, and means for controlling the movements of said slide.

14. In a machine of the type described, the combination of a wheel support, a platform adjustable to and from the support, pressure abutments sustained by said platform and connected to move in unison relatively to the platform in the direction of the axis of the hub, and actuating mechanism for positively moving said abutments to apply pressure to the wheel rim.

15. In a machine of the type described, the combination of means for supporting the wheel to be trued, a slide movable in the direction of the hub axis, pressure abutments pivoted to said slide and adapted to bear against the edges of the rim and movable on their pivotal axes to disengage the rim.

16. In a machine of the type described, the combination of means for supporting the wheel, a slide movable in the direction of the axis of the hub, actuating means therefor, arms pivoted to the slide to swing upward therefrom, and pressure rollers carried by the arms and adapted to bear against the edges of the rim.

17. In a machine of the type described, the combination of means for supporting the wheel to be trued, a platform, a slide mounted thereon and movable relatively in the direction of the hub axis, pressure abutments carried by the slide and adapted to act on the edges of the rim, a pointer carried by the slide, a fixed scale adapted to be read in connection with the pointer, and means for actuating the slide.

18. In a machine of the type described, the combination of the supporting frame, a wheel supporting spindle extending laterally therefrom, a fixed sustaining bracket or support on the frame, a platform mounted on said support and adjustable to and from the wheel supporting spindle, a slide mounted on the platform and movable in the direction of the hub axis, means for actuating the slide, and abutments carried by the slide and adjustable thereon in the direction of its movements and adapted to bear against the edges of the rim.

19. In a machine of the type described, the combination of means for supporting the wheel, a pressure abutment adapted to bear against the edge of the wheel and movable freely in the direction of the hub axis, a pointer movable with said pressure abutment to indicate deviations in the rim, and means for positively moving said abutment to apply pressure to the rim.

In testimony whereof I hereunto set my hand this third day of February, 1906, in the presence of two attesting witnesses.

EMIL EINFELDT.

Witnesses:
M. LOUISE DODGE,
ANDREW NEILSON.